United States Patent Office 3,497,590
Patented Feb. 24, 1970

3,497,590
ORAL COMPOSITIONS CONTAINING NON-TOXIC, NON-VOLATILE ALIPHATIC ALDEHYDE
Edward Eigen, East Brunswick, N.J., assignor to Colgate-Palmolive Company, New York, N.Y., a corporation of Delaware
No Drawing. Filed Aug. 24, 1967, Ser. No. 662,894
Int. Cl. A61k 7/16
U.S. Cl. 424—55                     8 Claims

ABSTRACT OF THE DISCLOSURE

This disclosure relates to oral compositions having cleansing properties and being particularly effective in preventing dental calculus and in reducing caries formation in the mouth, containing as the active ingredient a non-toxic, non-volatile aliphatic aldehyde or oxyderivative thereof in a compatible dental vehicle.

---

The present invention relates to an oral composition effective in preventing dental calculus formation and in reducing caries formation in the mouth, comprising an aliphatic aldehyde or an oxyderivative thereof in a dental vehicle.

The dentifrice art is replete with a variety of compositions for cleansing the teeth. Certain ingredients have been incorporated in dental formulations to effect specific results with bactericides, odor inhibitors, sweeteners, fluorides, etc. The problem of providing a composition capable of preventing calculus which forms in the mouth is well recognized in the field. Calculus is the hard deposit which forms around the teeth and under the gums. If it is not removed, it causes inflammation and eventually leads to peridontal disease. Calculus is derived from plaque which is a soft material that deposits on the teeth. Plaque contains bacteria which can cause dental caries. It is desirable, therefore, to formulate a dental composition which will modify or remove plaque, thereby rendering it incapable of calcifying into calculus and prevent the accumulation of caries forming organisms therewith.

It has now been found that dentifrice compositions containing non-toxic, non-volatile aliphatic aldehydes or oxyderivatives thereof in a compatible vehicle exhibit unique and improved properties, particularly in the inhibition of calculus formulation and the prevention of the accumulation of caries forming organisms in the mouth. The instant aldehydes are capable of reacting with the amino groups of proteins and amino acids, thereby decreasing the theoretical cause of calculus formation. The theory has been expounded that the amino groups act as nuclei for the deposition of plaque which subsequently calcifies into calculus. Consequently the presence of the aforesaid aldehydes eliminates the amino groups by reacting therewith, thereby preventing nucleation which results in the deposition of calculus. In addition, by preventing calculus formation, the retention of caries forming organisms is eliminated. Consequently, the aldehydes serve the dual function of preventing calculus formation and reducing dental caries. Moreover, the aldehydes of this invention do not tend to cause substantial decalcification of dental enamel when applied to the oral cavity.

The aliphatic aldehydes utilized herein are nontoxic, non-volatile and capable of reacting with amino groups. Specific examples of aliphatic aldehydes utilized in the invention are glutaraldehyde and an oxyderivative of an aliphatic aldehyde glyoxylic acid.

The dental preparations containing the aforedefined aliphatic aldehydes exhibit many desirable properties. They are effective for general cleansing purposes and exhibit the unique property of inhibiting dental calculus formation. The relative effectiveness of these materials can be determined by both in vivo and in vitro test procedures. The in vivo tests involve feeding rats and/or hamsters a controlled diet over a period of time (at least about 1 week), swabbing their jaws for thirty seconds twice daily with a solution of the test compound, sacrificing after the desired testing period, and scoring the defleshed jaws as to the amount of deposit found on the teeth of the upper jaw. The results of the in vivo calculus experiments showed that aliphatic aldehydes in concentrations as low as .01% are effective in reducing the deposition of dental calculus.

The in vivo calculus conditions prevailing in animals such as rats or hamsters are believed to approximate the conditions prevailing in higher mammals such as humans when plaque or early stages of non-completely calcified calculus is present or tends to form. Thus, a concentration of an additive when swabbed thirty seconds twice daily in the jaws of animals such as rats or hamsters and reduces calculus in such animals would be expected to also exert a beneficial effect in higher mammals when administered regularly to their oral cavities.

The in vitro test procedure of Yankelowitz et al. was used (J. Dent. Res. 44, 648, 1965) to determine the effectiveness of the aldehydes as an anti-calculus agent. Glass slides are rotatably immersed and dried in a substantially neutral saliva medium containing .05% monocalcium phosphate and the aldehyde to be tested for a period of 4 hours, after which time the slides are scored from 1 to 4 depending on the amount of deposit, the lower figure being indicative of a small deposit. Results of these tests indicated that aliphatic aldehydes in concentrations of 1.25 to 6.25% were effective anti-calculus agents.

The in vitro calculus produced in accordance with the procedure of the Yankelowitz et al. article after up to about 4 hours is believed to approximate the conditions prevailing in vivo in higher mammals when plaque or early stages of the non-completely calcified calculus is present or tends to form. Thus, a concentration of an additive which is effective in the in vitro procedure would be expected to also exert a beneficial effect in higher mammals when administered regularly to their oral cavities.

These aldehydic compounds exert their beneficial functions in a dental preparation in variable proportion depending upon the type of composition, e.g. dental cream, powder, mouth-rinse, etc., and the specific effects desired. In general, an effective minor amount will be used such as up to about 6.25% by weight, usually at least about .01% and preferably from .25 to 2.5% depending on the type of dentifrice and the other ingredients.

The aldehyde ingredient may be utilized in any preparations designed for application to the oral cavity which are referred to herein as dental reparations. Such dental preparations include suitable toothpastes and dental creams, tooth powders, liquid dentifrices, mouth washes or rinses, lozenges, tablets, chewing gum, dental floss and the like. These preparations may contain various adjuvant materials in suitable amounts provided the same do not substantially adversely affect the desired results.

Any suitable practically water-insoluble polishing agent may be admixed with these aldehyde compounds in the preparation of the dentifrice compositions such as tooth powders, pastes, creams and the like. Representative materials include, for example, dicalcium phosphate, tricalcium phosphate, calcium pyro-phosphate calcium metaphosphate, insoluble sodium metaphosphate, almuinum hydroxide, magnesium carbonate, calcium sulfate, bentonite, etc., including suitable mixtures thereof. Resinous abrasive substances such as condensation products of melamine and urea with formaldehyde, etc., can be used also. It is preferred to use the water-insoluble phosphate salts as the main polishing agents such as insoluble sodium metaphosphate and/or a calcium phosphate, e.g. dicalcium phosphate dihydrate. In general, these polishing agents will comprise a major proportion by weight of the solid ingredients. The polishing agent content is variable, but will generally be up to about 95% by weight of the total composition. In the case of dental cream, such polishing agents will generally comprise from about 50% to 75% whereas, in tooth powders, the polishing agents will usually be in greater proportion, such as from about 85% to 98%.

The dentifrice composition should contain usually any suitable surface-active or detersive material to provide desired detersive and foaming properties. Suitable detergents are water-soluble salts of higher fatty acid monoglyceride monosulfate, higher alkyl sulfate, alkyl aryl sulfonate, higher alkyl sulfoacetate, higher fatty acid ester of 1,2 di-hydroxy propane sulfonate, higher fatty acid amides of taurine and higher fatty acid esters of isothionic acid; the substantially saturated higher aliphatic acyl amides of lower aliphatic amino carboxylic acid compounds, such as those having 12 to 16 carbons in the acyl radical, and the like. Examples of such amides are N-lauroyl, myristoyl or palmitoyl sarcosides. The various surface-active materials should be used in a suitable amount such as up to about 10%, preferably from about 0.5 to 5% by weight of the dentifrice preparation.

In dental cream formulations, the liquids and solids should necessarily be proportioned to form a creamy mass of desired consistency which is capable of being extruded from a collapsible aluminum or lead tube. In general, the liquids in the dental cream will comprise chiefly water, glycerine, sorbitol, propylene glycol, etc., including suitable mixtures thereof. It is advantageous usually to use a mixture of both water and a humectant or binder such as glycerine or sorbitol, preferably 10 to 40% each of water and humectant. The total liquid content will generally be from about 20% to 75%, usually about 30 to 65%, by weight of the formulation. It is preferred to use also a gelling agent in dental creams such as the natural and synthetic gums and gum like materials, e.g. Irish moss, gum tragacanth, sodium carboxymethylcellulose, propylvinylpyrrolidone, starch and the like, usually in an amount up to about 10% and preferably from about 0.5% to 5% of the formulation.

Mouth washes or rinses may be formulated also with suitable selected ingredients. Such products usually comprise an effective amount of the aldehyde compound dissolved, dispersed or otherwise incorporated in a suitably flavored liquid vehicle, preferably an aqueous alcohol vehicle. The alcohol, e.g. ethanol, concentration may vary depending on the mouth effect desired and usually comprises from about 5% to 70% alcohol, and preferably from 5% to 40% by weight and effective to suitably dissolve or disperse the aldehyde compound. Liquid dentifrices usually contain a minor amount of active ingredient, normally dissolved or dispersed in an aqueous alcohol vehicle, and preferably containing a mucilaginous material and optionally combined wtih small amounts of polishing agent, glycerine, coloring and flavoring materials. Other types of oral preparations include lozenges, tablets, chewing gums, etc.

Various other adjuvant materials may also be incorporated in the present dental preparations. Added materials in the formulation which do not substantially adversely affect the properties and characteristics may be suitably selected and used in proper amount depending upon the particular type of preparation. Typical of the type of additives that may be used are soluble saccharine, flavoring oils (e.g., oils of spearmint, peppermint, wintergreen), coloring or whitening agents (e.g., titanium dioxide), preservatives (e.g. sodium benzoate), emulsifying agents, alcohol, menthol and the like. Other suitable materials are chlorophyllin and various fluorides such as stannous fluoride, etc.

The following specific examples are further illustrative of the nature of the present invention, but it is to be understood that the invention is not limited thereto. The compositions are prepared in the usual manner as indicated, and all amounts of the various ingredients are by weight unless otherwise specified.

EXAMPLE I

Mouthrinse

| | Percent by weight |
|---|---|
| Ethanol | 10.0 |
| Glutaraldehyde | 0.5 |
| Flavor | 2.0 |
| Water | 87.5 |

The above ingredients were thoroughly mixed, resulting in an improved mouth-wash solution.

EXAMPLE II

The glutaraldehyde ingredient of Example I was increased to 2.5% and the water reduced accordingly. In vivo tests on rats indicated a 46% reduction in calculus formation.

EXAMPLE III

1% glyoxylic acid was substituted for the glutaraldehyde in Example I and the water content reduced accordingly. In vivo tests on rats showed a 41% reduction in calculus formation.

EXAMPLE IV

The glutaraldehyde content of Example I was increased to 1% and the amount of water reduced accordingly. In vivo tests on rats indicated a 52% reduction in calculus formation.

EXAMPLE V

Dental cream

| | Percent by weight |
|---|---|
| Glycerine | 19.75 |
| Carboxymethylcellulose | 0.84 |
| Sodium benzoate | 0.50 |
| Sodium saccharinate | 0.20 |
| Tetrasodium pyrophosphate | 0.25 |
| Deionized water | 20.53 |
| Dicalcium phosphate dihydrate | 46.28 |
| Calcium carbonate | 4.95 |
| Sodium N-lauroyl sarcosinate | 5.66 |
| Flavor | 0.79 |
| Glutaraldehyde | 0.25 |

EXAMPLE VI

Tooth powder

| | Percent by weight |
|---|---|
| Magnesium silicate | 7.00 |
| Sodium saccharin | 0.15 |
| Flavor | 2.50 |
| Dicalcium phosphate dihydrate | 85.60 |
| Glutaraldehyde | 0.25 |
| Sodium salt of hydrogenated coconut oil monoglyceride | 4.50 |

EXAMPLE VII

Mouthwash

| | Percent by weight |
|---|---|
| Ethyl alcohol | 14.85 |
| Flavor | 0.15 |
| Polyoxyethylene (20 moles) sorbitan monooleate | 1.09 |
| Glycerine | 9.90 |
| Deionized water | 73.13 |
| Sodium saccharinate | 0.04 |
| Red dye | 0.44 |
| Yellow dye | 0.15 |
| Glutaraldehyde | 0.25 |

Although the present invention has been described with reference to particular embodiments and examples, it will be apparent to those skilled in the art that variations and modifications of this invention can be made and that equivalents can be substituted therefor without departing from the principles and true spirit of the invention.

What is desired to be claimed is:

1. An oral composition comprising an effective amount up to 6.25% of a non-toxic, non-volatile material selected from the group consisting of the aliphatic aldehyde glutaraldehyde and the aliphatic aldehyde oxyderivative glyoxylic acid and a dental vehicle.

2. An oral composition in accordance with claim 1, wherein the aldehyde ingredient constitutes .05–6.25% by weight of the composition.

3. A dentifrice in accordance with claim 1, wherein the material is glutaraldehyde.

4. A dentifrice in accordance with claim 1, wherein the material is glyoxylic acid.

5. A dentifrice in accordance with claim 1, wherein the material constitutes 0.25–2.5% by weight of the composition.

6. A mouthrinse in accordance with claim 5, which contains 1% glutaraldehyde.

7. A dental cream in accordance with claim 5, which contains 0.25% glutaraldehyde.

8. A toothpowder in accordance with claim 5, which contains 0.25% glutaraldehyde.

References Cited

UNITED STATES PATENTS

| | | | |
|---|---|---|---|
| 2,801,216 | 7/1957 | Yoder et al. | 424—333 |
| 3,282,775 | 11/1966 | Stonehill | 424—333 |

OTHER REFERENCES

Chemical Abstracts, vol. 52, entry 3952g, 1958, citing Balogh et al., Deut. Zahn-, Mund-u. Kieferheilk, 24, 475–80 (1956).

Chemical Abstracts, vol. 64, entry 1050b, 1966, citing Borick, Biotechnol. Bioeng. 7(3), 435–43 (1965).

Journal of the American Pharmaceutical Association, Practical Pharmacy Edition, June 1949, p. 380.

Manly, Drug and Cosmetic Industry, vol. 76, No. 3, pp. 326, 327, and 422–425, March 1955.

RICHARD L. HUFF, Primary Examiner

U.S. Cl. X.R.

424—48, 49, 317, 333